(12) United States Patent
Yamane et al.

(10) Patent No.: US 7,244,202 B2
(45) Date of Patent: Jul. 17, 2007

(54) STEP MOTOR POSITIONING STRUCTURE FOR BELT-TYPE CONTINUOUSLY VARIABLE TRANSMISSION

(75) Inventors: Nobufumi Yamane, Tokyo (JP);
Hiroyuki Yada, Kanagawa (JP)

(73) Assignee: JATCO Ltd, Fuji-shi (JP)

( * ) Notice: Subject to any disclaimer, the term of this patent is extended or adjusted under 35 U.S.C. 154(b) by 15 days.

(21) Appl. No.: 11/086,399

(22) Filed: Mar. 23, 2005

(65) Prior Publication Data

US 2005/0233843 A1    Oct. 20, 2005

(30) Foreign Application Priority Data

Mar. 31, 2004   (JP)   ............... 2004-108196

(51) Int. Cl.
*F16H 9/00* (2006.01)
*F16H 59/00* (2006.01)
*F16H 61/00* (2006.01)
*F16H 63/00* (2006.01)

(52) U.S. Cl. ..................................... 474/70

(58) Field of Classification Search ............... 474/26, 474/18, 29, 30, 31, 40, 70, 69; 248/74.3, 248/74.4
See application file for complete search history.

(56) References Cited

U.S. PATENT DOCUMENTS

| | | | | |
|---|---|---|---|---|
| 3,064,486 A | * | 11/1962 | Aplin | .......................... 474/37 |
| 4,589,071 A | * | 5/1986 | Yamamuro et al. | ........... 701/55 |
| 4,597,308 A | | 7/1986 | Tanaka et al. | |
| 6,011,336 A | * | 1/2000 | Mathis et al. | .................. 310/91 |
| 6,326,054 B1 | * | 12/2001 | Smith et al. | ................. 427/168 |
| 6,645,120 B1 | | 11/2003 | Nishio et al. | |
| 7,029,410 B2 | * | 4/2006 | Sawada et al. | ................ 474/28 |
| 7,066,855 B2 | * | 6/2006 | Watanabe et al. | ............. 474/18 |
| 2005/0192131 A1 | * | 9/2005 | Yamamoto et al. | ........... 474/18 |
| 2005/0192134 A1 | * | 9/2005 | Yamane et al. | ................ 474/18 |
| 2005/0231047 A1 | * | 10/2005 | Yamane et al. | ................ 310/52 |

FOREIGN PATENT DOCUMENTS

| | | |
|---|---|---|
| DE | 600 03 704 T2 | 5/2004 |
| GB | 2 091 946 A | 8/1992 |

* cited by examiner

*Primary Examiner*—Richard Ridley
*Assistant Examiner*—Terence Boes
(74) *Attorney, Agent, or Firm*—Foley & Lardner LLP

(57) ABSTRACT

A step motor positioning structure for a belt-type continuously variable transmission having a speed-change control valve for controlling a primary pressure to be supplied to a primary pulley, a servo link, and a step motor for driving, by way of the servo link, the speed-change control valve in response to a speed-change command signal is provided. The step motor positioning structure includes a motor bracket formed integral with the step motor and having an elongated hole and a circular hole, a bracket support supporting thereon the motor bracket, a first positioning member protruding outward from the bracket support and inserted in the elongated hole, and a second positioning member protruding outward from the motor support and inserted in the circular hole.

18 Claims, 10 Drawing Sheets

PRIOR ART

PRIOR ART

PRIOR ART

STEP MOTOR POSITIONING STRUCTURE FOR BELT-TYPE CONTINUOUSLY VARIABLE TRANSMISSION

BACKGROUND OF THE INVENTION

The present invention relates to a belt-type continuously variable transmission and more specifically to a step motor positioning structure for positioning a step motor that drives a speed-change control valve for controlling an oil pressure to be supplied to a pulley of a belt-type continuously variable transmission.

It is known that a belt-type continuously variable transmission using a V-belt (hereinafter referred to simply as belt-type CVT) is suited for use in vehicles.

Referring to FIG. 8, an example of a belt-type CVT will be described.

The belt-type CVT includes a speed-change mechanism 100 whose principal portion is constituted by a pair of pulleys, i.e., a primary pulley 16 on the input shaft 15 side and a secondary pulley 26 on the output shaft 30 side. The input shaft 15 is connected to an engine by way of a forward and reverse switching mechanism 14 and a torque converter (not shown) having a lock-up clutch.

The pulleys 16, 26 of the speed-change mechanism 100 are drivingly connected to each other by a V-belt 12.

The primary pulley 16 consists of a fixed sheave 16a rotatable together with the input shaft 15 and a movable sheave 16b axially movable relative to the fixed sheave 16a so as to form therebetween a pulley groove of a variable width. The secondary pulley 26 consists of a fixed sheave 26a rotatable together with the output shaft 30 and a movable sheave 26b axially movable relative to the fixed sheave 26a so as to form therebetween a pulley groove of a variable width.

The primary pulley 16 and secondary pulley 26 are provided with a primary cylinder chamber 17 and a secondary cylinder chamber 27 and supplied with a primary pressure and secondary pressure from an oil pressure control section 105, respectively.

The oil pressure control section 105 generates a line pressure by regulating an oil pressure from an oil pump OP. Further, the oil pressure control section 105 controls the line pressure in response to a command from a CVT control unit 103 to produce a primary pressure and a secondary pressure.

During running of a vehicle, the widths of the pulley grooves of the primary pulley 16 and secondary pulley 26 are varied depending upon a variation of an oil pressure supplied to the respective cylinder chambers 17, 27, thus varying the winding diameters of the belt 12 wound around the pulleys 16, 26 thereby varying the transmission ratio between the primary pulley 16 and the secondary pulley 26 continuously.

FIG. 9 shows a primary pressure supply circuit structure in the oil pressure control section 105 for supplying a primary pressure to the primary pulley cylinder chamber 17. The oil pressure control section 105 (refer to FIG. 8) includes a speed-change control valve 35 for controlling the primary pressure through control of the line pressure. Herein, the line pressure serves as the second pressure and is supplied to the secondary cylinder chamber 27.

The speed-change control valve 35 has a valve spool 36 connected to an intermediate portion of a servo link 50 that constitutes a mechanical feedback device and is driven by a step motor 40 connected to an end of the servo link 50. The other end of the servo link 50 is connected to a pulley follower 45 that follows movement of the movable sheave 16b of the primary pulley 16. By this, the shift control valve 35 receives feedback of the width of the pulley groove of the primary pulley 16, i.e., the actual transmission ratio.

The transmission ratio between the primary pulley 16 and the secondary pulley 26 is controlled by the step motor 40 that operates in response to a speed-change command signal from the CVT control unit 103.

In the meantime, the line pressure is controlled to a predetermined value in accordance with an engine operating condition, by means of a pressure control valve (not shown) and based on a command (e.g., a duty signal) from the CVT control unit 103.

FIGS. 10 and 11 show a step motor attaching structure according to an earlier technology.

Right under the primary pulley 16 and within a transmission case 102 is disposed a guide shaft 108 that is positioned between the transmission case 102 and a pulley support block 106 and in parallel with an axis of rotation of the primary pulley 16. The pulley support block 106 is fixedly disposed within the transmission case 102. The pulley follower 45 is slidably supported on the guide shaft 108.

The pulley follower 45 has a sleeve portion 46 rotatable on the guide shaft 108 and an engagement portion 47 extending from the sleeve portion 46 toward the primary pulley 16 side.

The engagement portion 47, when viewed in the axial direction of the guide shaft 108, is in the form of a circular arc corresponding to the outer periphery of the movable sheave 16b of the primary pulley 16. The engagement portion 47 has a first surface 47A in contact with the movable sheave 16b, which first surface is located on the side opposite to the fixed sheave 16a side and a second surface 47B in contact with the outer circumferential periphery of the movable sheave 16b.

The pulley follower 45 is always urged against the movable sheave 16b (refer to FIG. 8) by means of a spring 58 disposed between the transmission case 102 and the pulley follower 45 and slidably movable on the guide shaft 108 in accordance with a variation of the axial position of the movable sheave 16b.

The sleeve portion 46 of the pulley follower 45 is provided with a pin support portion 49. Under the condition where the engagement portion 47 is in contact with the peripheral portion of the movable sheave 16b, the pin support portion 49 protrudes vertically upward from the sleeve portion 46 while allowing a connecting pin 48 to extend horizontally.

The speed-change control valve 35 includes a valve bore (refer to FIG. 9) in parallel with the guide shaft 108 and a valve spool 36 slidably disposed in the valve bore.

The step motor 40 is disposed adjacent the speed-change control valve 35 and on the side thereof opposite to the guide shaft 108. An output rod 42 of the step motor 40 extends in parallel with the guide shaft 108.

The step motor 40 is attached to a stationary support (not shown) as follows. First, a motor bracket 41B integral with the step motor 40 is placed on the stationary support. Then, two bolts 63 are screwed into corresponding threaded holes of the stationary support through respective bolt holes of the motor bracket 41B and tightened to fix the motor bracket 41B to the stationary support.

The output rod 42 of the step motor 40 has a bifurcated end portion and is provided with a pin 43 at the bifurcated end portion. The valve spool 36 of the speed-change control valve 35 has at an end thereof a block 37 which is formed with a pivot pin hole (no numeral).

The servo link 50 extends vertically and has an intermediate portion to which a pivot pin 55 is fixedly attached. The pivot pin 55 is rotatably fitted in the pivot pin hole of the block 37 of the valve spool 36.

The servo link 50 is in the form of a plate and has a straight line shape. The servo link 50 has axially opposite bifurcated end portions 52, 53, one 52 of which is engaged with the connecting pin 48 of the pulley follower 45 by holding the pin 48 between the prongs thereof and the other 53 of which is engaged with the connecting pin 43 of the output rod 42 of the step motor 40 by holding the pin 43 between the prongs thereof. Namely, the servo link 50 is swingably or pivotally connected at the opposite ends to the pulley follower 45 and the output rod of the step motor 40 and at the intermediate portion to the valve spool 36 of the speed-change control valve 35.

In accordance with movement of the servo link 50 that is responsive to an operation of the step motor 40, the valve spool 36 is axially moved to cause the speed-change control valve 35 to perform supply or discharge of oil pressure to or from the primary cylinder chamber 17 and thereby control the primary pressure so that a target transmission ratio commanded by the driving position of the step motor 40 is attained. After the movable sheave 16b is moved to complete a speed-change, the speed-change control valve 35 is closed in response to pivotal movement of the servo link 50 in the opposite direction.

SUMMARY OF THE INVENTION

In the step motor attaching structure described as above, there is a difficulty in positioning the step motor 40 due to a play or space provided between the bolts 63 and bolt holes 44 of the motor bracket 41B, i.e., the step motor 40 is moved out of place as shown by two-dot chain lines in FIG. 10 while causing the motor bracket 41B to slide on the stationary support and thereby causing the direction of the output rod 42 of the step motor 40 to be deviated from a predetermined direction.

In this instance, as will be seen from FIG. 10, the pin 43 at which the output rod 42 of the step motor 40 and the servo link 50 are engaged constitutes an effort point, the pin 55 at which the valve spool 36 of the speed-change control valve 35 and the servo link 50 are engaged constitutes a load or operating point, and the pin 48 at which the pulley follower 45 and the servo link 50 are engaged constitutes a fulcrum.

When the step motor 40 is moved out of place in the longitudinal direction of the servo link 50 to vary an inclination of the output rod 42 relative to the servo link 50, the point of engagement between the pin 43 and the engagement portion 53 is varied, thus varying the length between the effort point and the operating point.

By this, the ratio between the distance of the effort point from the fulcrum and the distance of the operating point from the fulcrum is deviated from a predetermined value, thus causing a difference between the transmission ratio commanded by the step motor 40 and the actual transmission ratio.

It is accordingly an object of the present invention to provide a step motor positioning structure for a belt-type CVT that can position the step motor accurately.

According to an aspect of the present invention, there is provided a step motor positioning structure for a belt-type continuously variable transmission including a primary pulley, a secondary pulley, a belt wound around the primary pulley and the secondary pulley, a speed-change control valve for controlling a primary pressure to be supplied to the primary pulley, a servo link, and a step motor for driving, by way of the servo link, the speed-change control valve in response to a speed-change command signal, the servo link being connected to the primary pulley to follow a variation in a width of a groove of the primary pulley and thereby perform feedback control of the width of the groove of the primary pulley, the step motor positioning structure comprising a motor bracket formed integral with the step motor and having an elongated hole and a circular hole, a bracket support supporting thereon the motor bracket, a first positioning member protruding outward from the bracket support and inserted in the elongated hole, and a second positioning member protruding outward from the motor support and inserted in the circular hole.

According to another aspect of the present invention, there is provided a belt-type continuously variable transmission comprising a primary pulley, a secondary pulley, a belt wound around the primary pulley and the secondary pulley, a speed-change control valve for controlling a primary pressure to be supplied to the primary pulley, a servo link, a step motor for driving, by way of the servo link, the speed-change control valve in response to a speed-change command signal, the servo link being connected to the primary pulley to follow a variation in a width of a groove of the primary pulley and thereby perform feedback control of the width of the groove of the primary pulley, a motor bracket formed integral with the step motor and having an elongated hole and a circular hole, a bracket support supporting thereon the motor bracket, a first positioning member protruding outward from the bracket support and inserted in the elongated hole, and a second positioning member protruding outward from the motor support and inserted in the circular hole.

DESCRIPTION OF THE PREFERRED EMBODIMENTS

Figure 1:
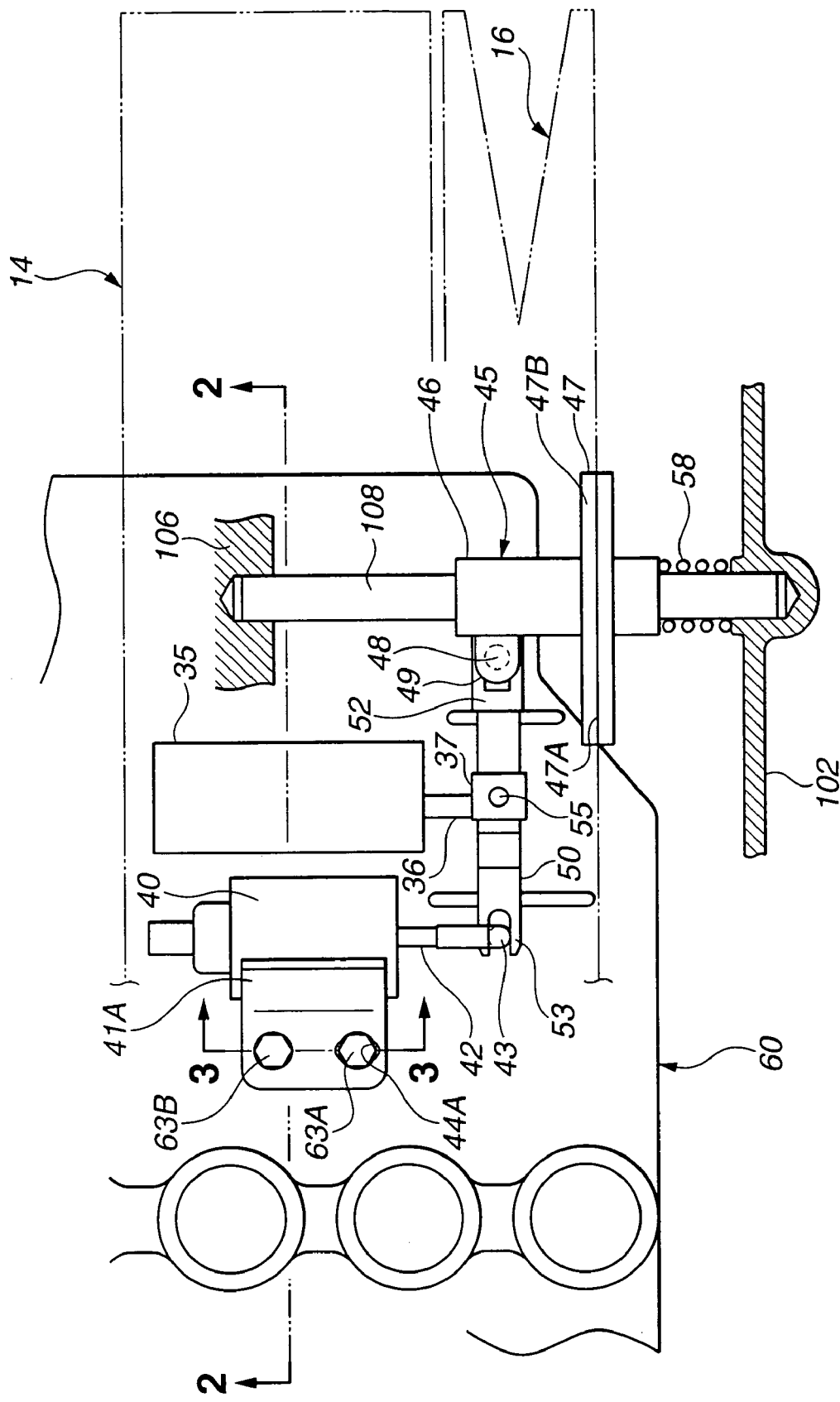
FIG. 1 is a plan view of a principal portion of a belt-type CVT to which the present invention is applied.

Referring to FIGS. 1 to 4, a step motor positioning structure for a belt-type CVT according to an embodiment of the present invention will be described. In FIGS. 1 to 4, like parts and portions to those described with respect to FIGS. 8 to 11 are designated by like reference characters and repeated description thereof is omitted for brevity.

A valve body 60 is disposed under the primary pulley 16 and has a base plate portion 61 and a protruded portion (no numeral) protruding upwardly from the base plate portion 61. The speed-change control valve 35 consists of a valve bore (no numeral) formed in the protruded portion of the valve body 60 and the valve spool 36 slidably disposed in the valve bore. The valve bore is disposed in parallel with and at nearly the same height as the guide shaft 108.

Figure 2:
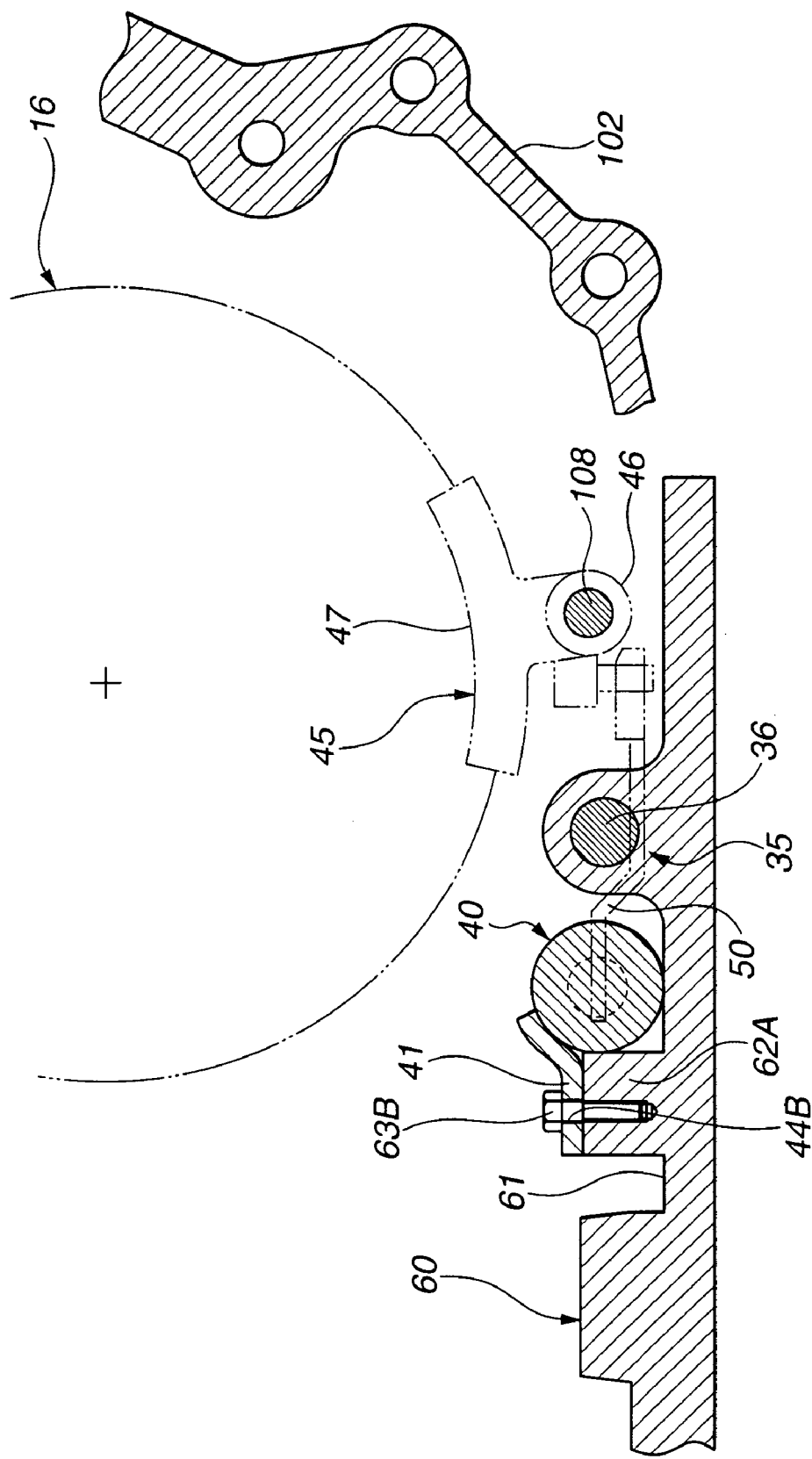
FIG. 2 is a sectional view taken along the line 2-2 in FIG. 1.

The valve body 60 further has an integral bracket support 62A protruding upward from the base plate portion 61. The step motor 40 is attached to the bracket support 62A so as to be positioned at nearly the same height as the guide shaft 108 and the speed-change control valve 35. For this reason, the servo link 50 is stepped vertically as shown in FIG. 2

The step motor 40 has an integral motor bracket 41 formed with bolt holes 44A, 44B that serve as positioning holes. The bolt holes 44A, 44B are used for mounting the motor bracket 41 to the bracket support 62A by means of reamer bolts 63A, 63B.

Figure 4:
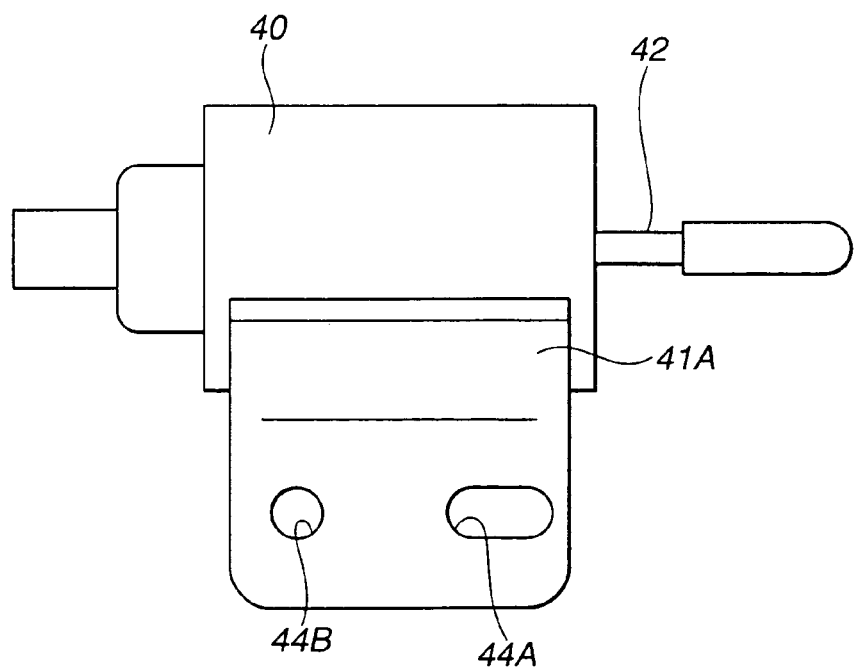
FIG. 4 is a plan view of a step motor employed in the step motor positioning structure of FIG. 3.

Specifically, the bolt hole 44A, as shown in FIG. 4, is an elongated hole that is elongated in the direction parallel with the axial direction of an output rod 42 of the step motor 40. The bolt hole 44B is a circular hole. Both of the bolt holes 44A, 44B are precision-finished by reamer for instance.

The reamer bolts 63A, 63B are screwed into threaded positioning holes 65, 65 formed in the bracket support 62A through the bolt holes 44A, 44B and tightened to clamp the motor bracket 41 between the heads of the reamer bolts 63A, 63B and the upper surface of the bracket support 62A and thereby fix the step motor 40 on the valve body 60. In the meantime, the elongated bolt hole 44A has a pair of parallel side walls that are opposed in a shorter width direction, and the reamer bolt 63A is fittingly engaged with the parallel side walls of the elongated hole 44A.

In this instance, the position of the output rod 42 of the step motor 40 in the longitudinal direction thereof is determined by means of the bolt hole 44B and the reamer bolt 63B, and inclination of the output rod 42 of the step motor 40 with respect to a predetermined direction is controlled by means of the elongated bolt hole 44A and the reamer bolt 63A, thus enabling the step motor 40 to be positioned and fixed accurately on the valve body 60.

By accurately positioning and fixing the step motor 40 by means of the two reamer bolts 63A, 63B, the ratio of the distance between the pin 43 constituting the effort point and the pin 55 constituting the operating point and the distance between the pin 48 constituting the fulcrum and the operating point is never deviated from a predetermined ratio, thus making it possible to perform an accurate speed-change control by the pulleys 16, 26.

Figure 5A:
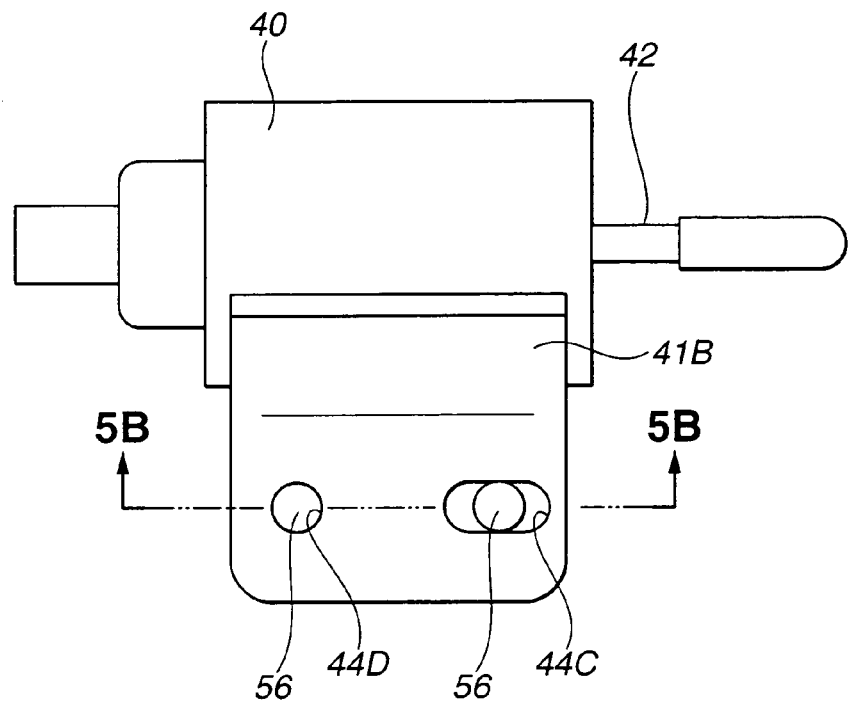
FIG. 5A is a plan view of a step motor positioning structure according to another embodiment of the present invention.
Figure 5B:
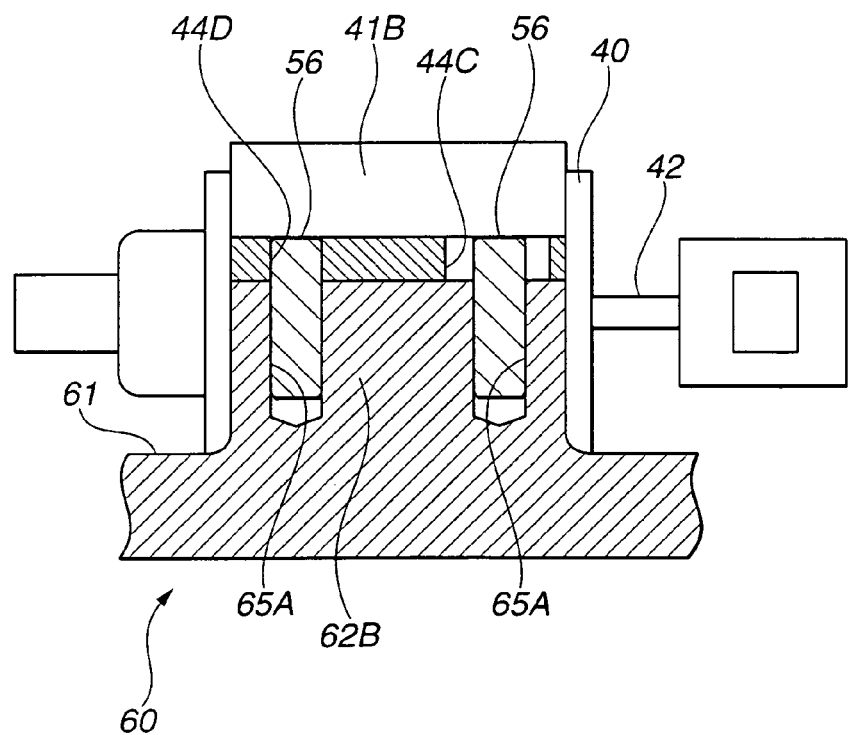
FIG. 5B is a sectional view taken along the line 5B-5B in FIG. 5A.

FIGS. 5A and 5B show another embodiment of the present invention.

Figure 3:
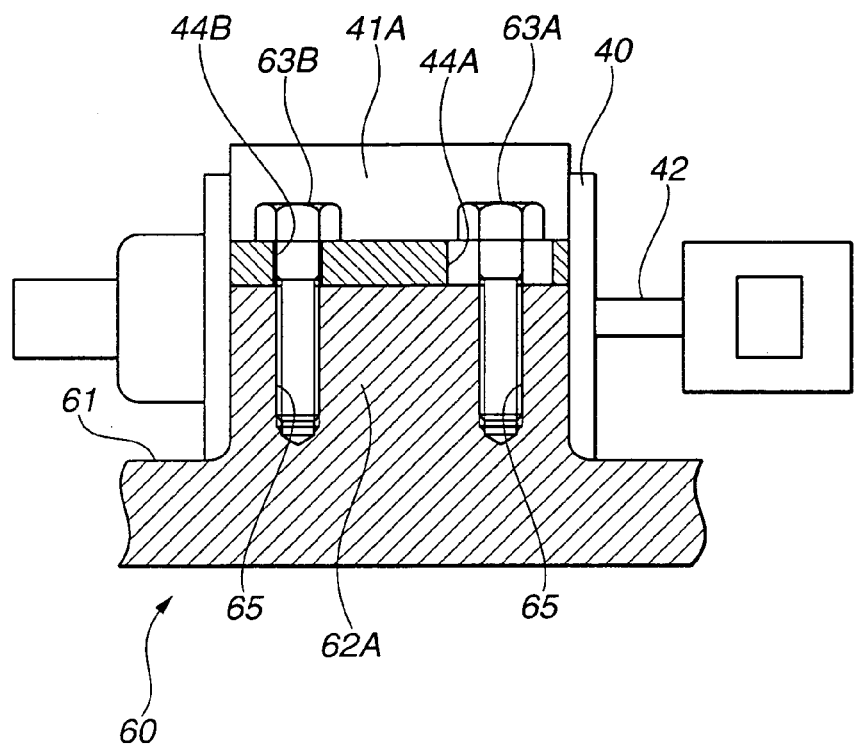
FIG. 3 is a sectional view taken along the line 3-3 in FIG. 1 and shows a step motor positioning structure according to an embodiment of the present invention.

In this embodiment, the reamer bolts 63A, 63B of the embodiment described with reference to FIGS. 3 and 4 are replaced by knock pins 56 that fit in an elongated pin hole 44C and circular pin hole 44D formed in the motor bracket 41. The bracket support 62B is formed with positioning pin holes 65A, 65A in which the knock pins 56 are force-fitted. By this embodiment, the knock pins 56 join the bracket support 62B and the motor bracket 41 together, thus enabling the motor bracket 41 to be fixed on the bracket support 62B and therefore the step motor 40 to be fixed on the valve body 60. The step motor 40 thus can be positioned and fixed accurately on the bracket support 62B by means of two knock pins 56.

Figure 6A:
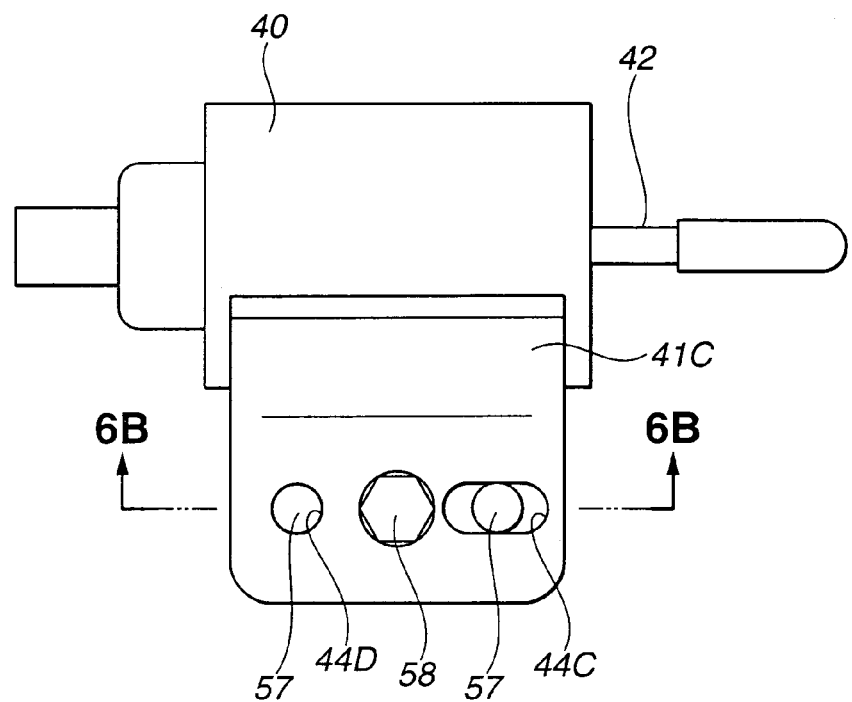
FIG. 6A is a plan view of a step motor positioning structure according to a further embodiment of the present invention.
Figure 6B:
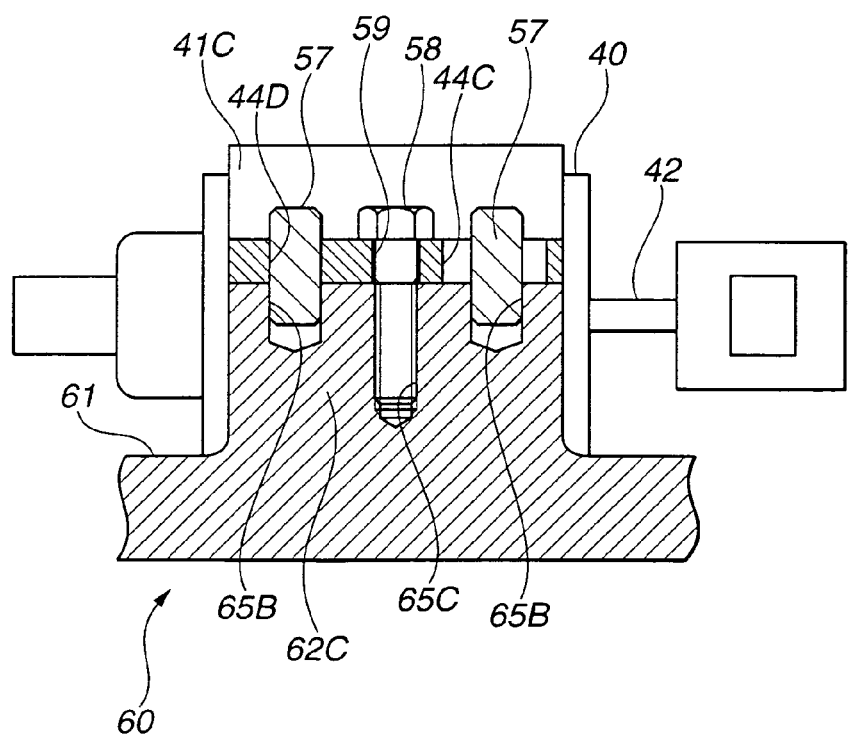
FIG. 6B is a sectional view taken along the line 6B-6B in FIG. 6A.

FIGS. 6A and 6B show a further embodiment of the present invention.

In this embodiment, the motor bracket 41A is provided with an elongated jig-pin hole 44C, a circular jig-pin hole 44D and a bolt hole 59 between the jig-pin holes 44C, 44D. The two jig-pin holes 44C, 44D are positioning holes, and the bolt hole 59 is not a positioning hole but a loose hole. The bracket support 62C is provided with two jig-pin holes 65B and a threaded hole 65C between the jig-pin holes 65B so as to be nearly equidistant from same.

In mounting of the step motor 40, two jig-pins 57 are fitted in the jig-pin holes 65B formed in the bracket support 62C. The motor bracket 41A is then placed on the bracket support 62C by fitting the jig-pins 57 in the jig-pin holes 44C, 44D of the motor bracket 41A, thereby positioning the step motor 40 on the bracket support 62C. Then, a bolt 58 is screwed into the threaded hole 65c of the bracket support 62C through the bolt hole 59 of the motor bracket 41A and tightened, thereby fixing the motor bracket 41A on the bracket support 62C.

The jig pins 57 may be removed after the motor bracket 41A is fixed on the bracket support 62C.

By this embodiment, the step motor 40 can be positioned and fixed accurately on the bracket support 62C by means of two jig-pins 57.

Figure 7A:
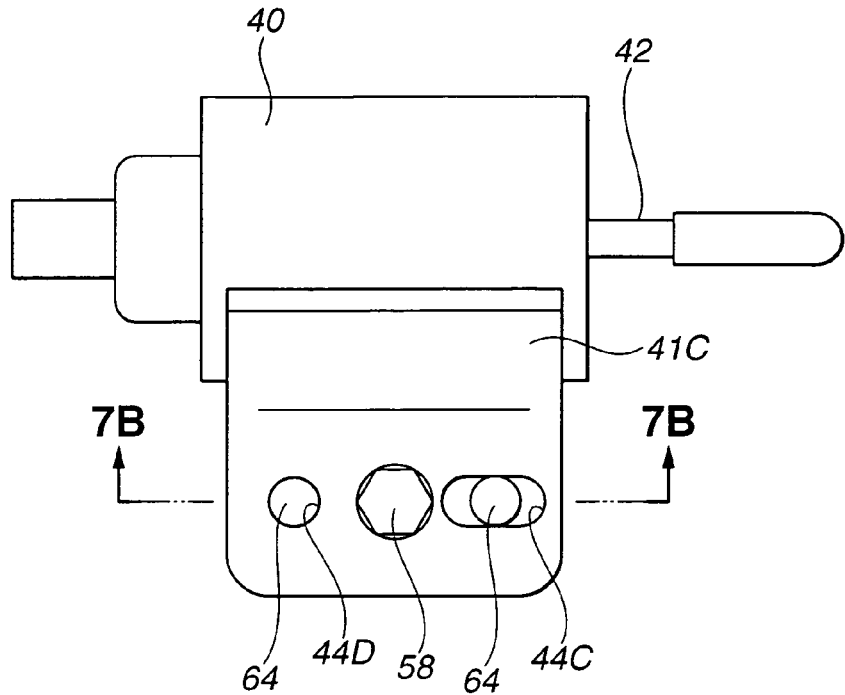
FIG. 7A is a plan view of a step motor positioning structure according to a further embodiment of the present invention.
Figure 7B:
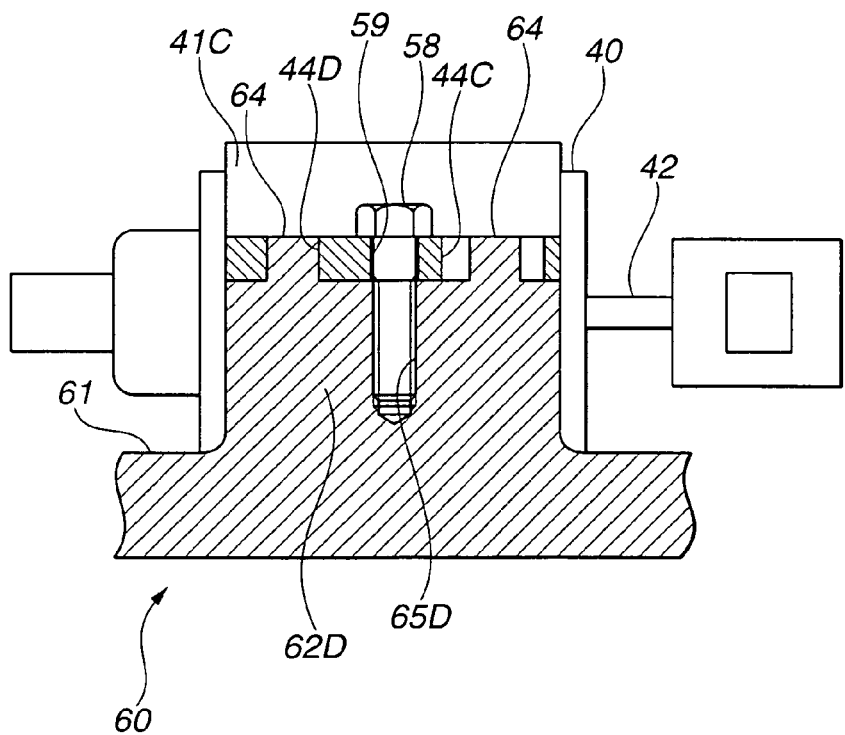
FIG. 7B is a sectional view taken along the line 7B-7B in FIG. 7A.
Figure 8:
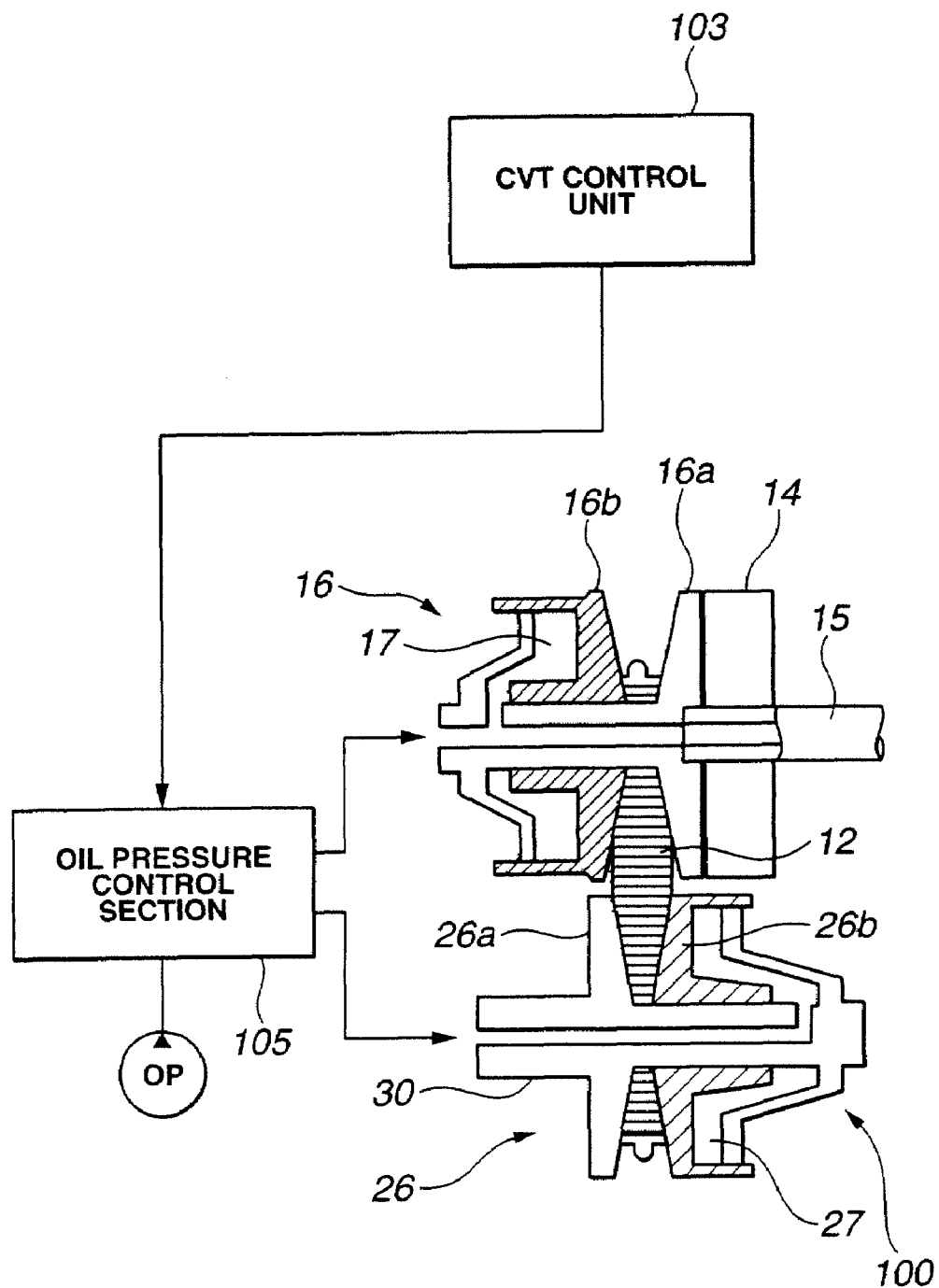
FIG. 8 is a schematic view of a speed-change control section of a V-belt CVT to which the present invention is applied.
Figure 9:
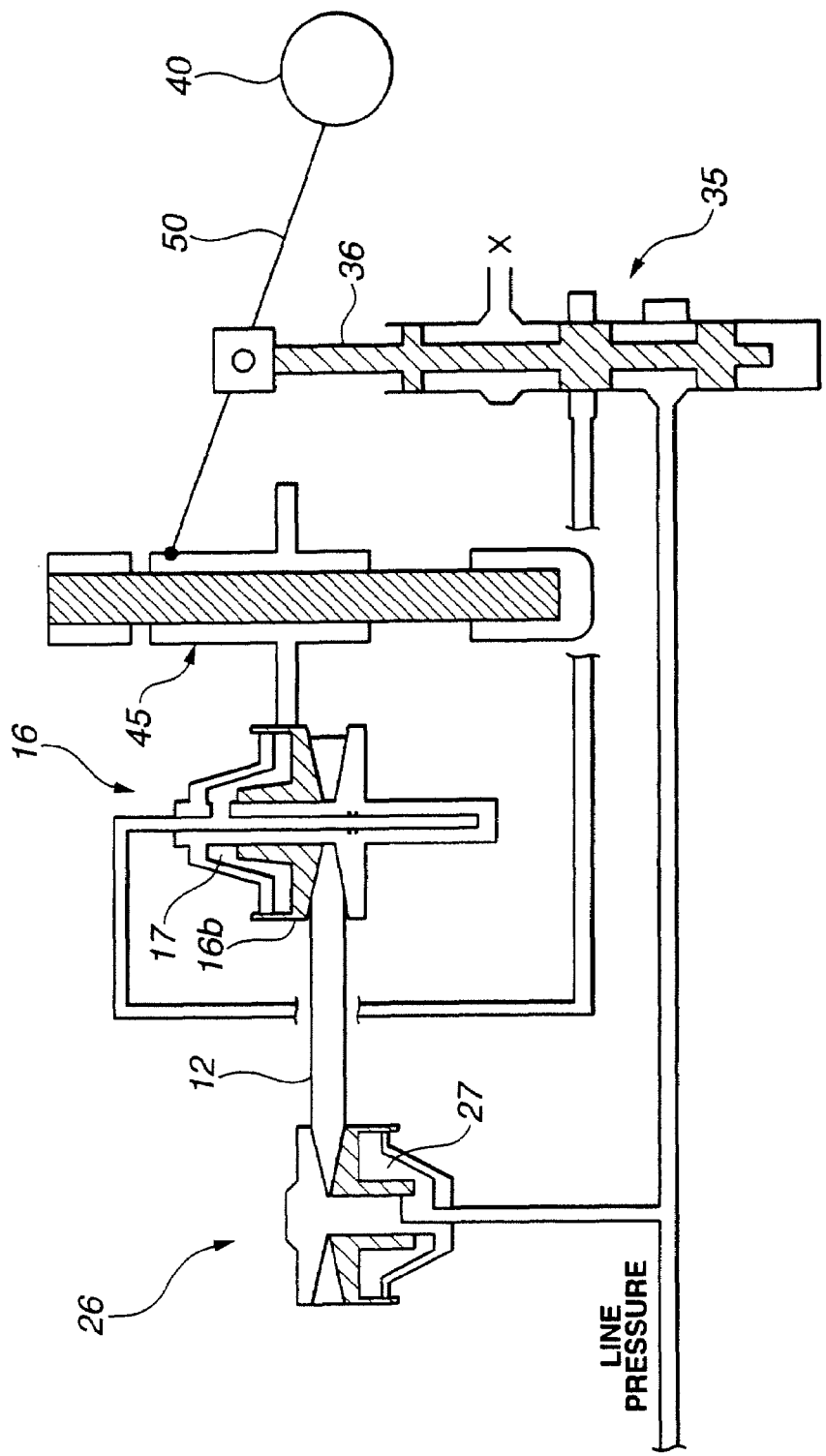
FIG. 9 is a schematic view showing a mechanical feedback device for performing feedback of a width of a pulley groove of a primary pulley.
Figure 10:
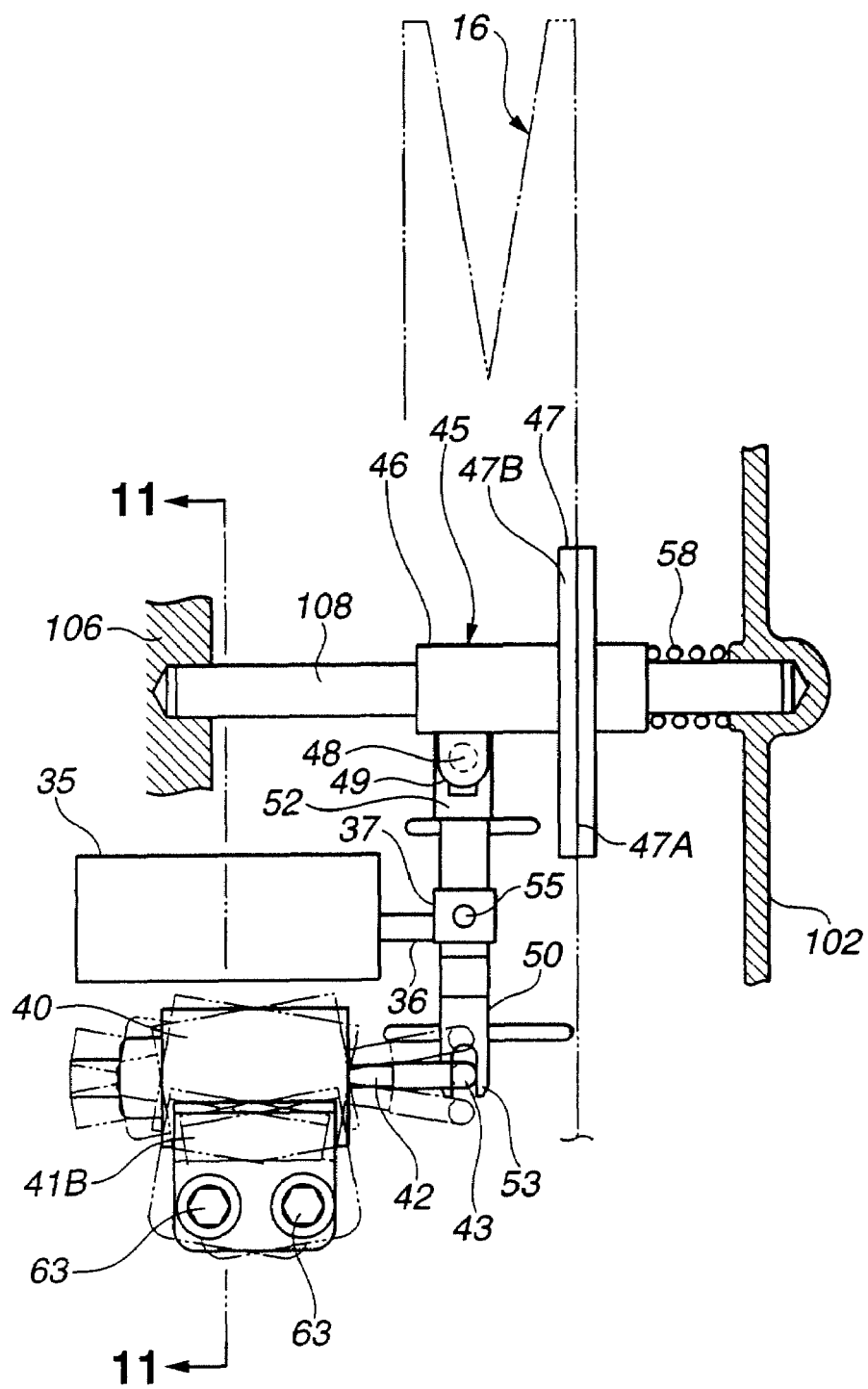
FIG. 10 is a view similar to FIG. 1 but shows an earlier technology.
Figure 11:
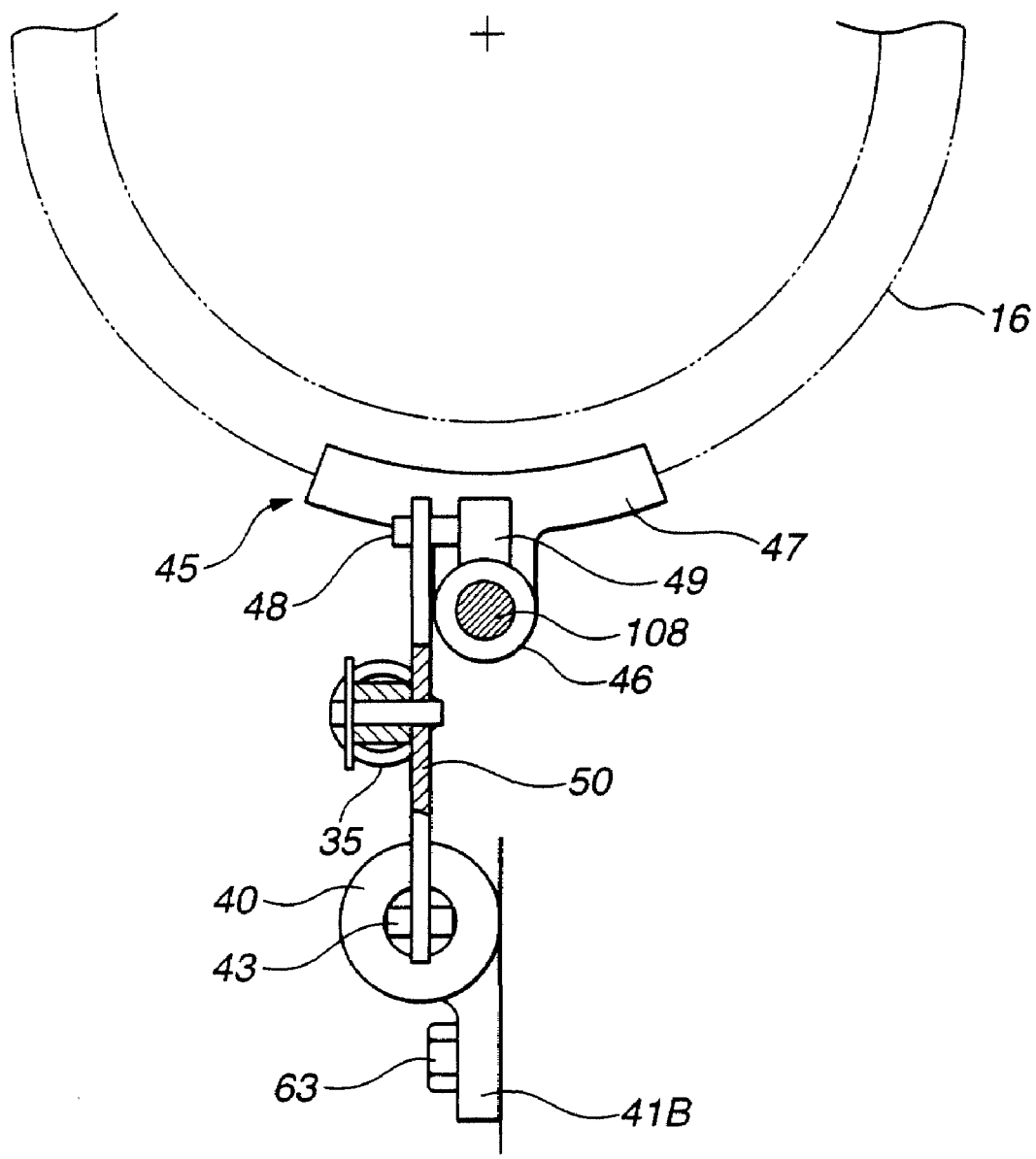
FIG. 11 is a sectional view taken along the line 11-11 of FIG. 10.

FIGS. 7A and 7B show a further embodiment of the present invention.

This embodiment is substantially similar to that described with reference to FIGS. 6A and 6B except that the bracket support 62D is formed with two integral projections 64 that are fittable in the pin holes 44C, 44D and serve as jig-pins.

In mounting of the step motor 40, the motor bracket 41A is placed on the bracket support 62D by fitting the projections 64 in the pin holes 44C, 44D, thereby positioning the step motor 40 on the bracket support 62D. Thereafter, the bolt 58 is screwed into the threaded hole 65D of the bracket support 62D through the bolt hole 59 of the motor bracket 41A and tightened, thereby fixing the motor bracket 41A on the bracket support 62D.

By this embodiment, the step motor 40 can be positioned and fixed accurately on the bracket support 62D by using two projections 64 provided to the bracket support 62D.

In the foregoing, it will be understood that the step motor 40 can be positioned by using two positioning devices or members selected from the group consisting of a reamer bolt, knock pin, jig-pin and projection.

The entire contents of Japanese Patent Applications P2004-108196 (filed Mar. 31, 2004) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A step motor positioning structure for a belt continuously variable transmission including a primary pulley, a secondary pulley, a belt wound around the primary pulley and the secondary pulley, a speed-change control valve for controlling a primary pressure to be supplied to the primary pulley, a servo link, and a step motor for driving, by way of the servo link, the speed-change control valve in response to a speed-change command signal, the servo link being connected to the primary pulley to follow a variation in a width of a groove of the primary pulley and thereby perform feedback control of the width of the groove of the primary pulley, the step motor positioning structure comprising:

a motor bracket formed integral with the step motor and having an elongated hole and a circular hole;
   a stationary bracket support supporting thereon the motor bracket;
   a first positioning member protruding outward from the bracket support and inserted in the elongated hole; and
   a second positioning member protruding outward from the bracket support and inserted in the circular hole,
   wherein the belt continuously variable transmission includes a valve body disposed under the primary pulley and constituting part of the speed-change control valve, and
   wherein the bracket support is integrally formed with the valve body to protrude upward therefrom.

2. A step motor positioning structure according to claim 1, wherein the elongated hole is elongated in the direction parallel with an axial direction of an output rod of the step motor.

3. A step motor positioning structure according to claim 1, wherein the elongated hole has a pair of parallel side walls that are opposed in a shorter width direction, and the first positioning member is fittingly engaged with the parallel side walls of the elongated hole.

4. A step motor positioning structure according to claim 1, wherein the first positioning member comprises one of a reamer bolt screwed into a corresponding threaded hole formed in the bracket support, a knock pin force-fitted in a corresponding hole formed in the bracket support, a jig-pin fittingly engageable in a corresponding hole formed in the bracket support and removable from the bracket support after positioning and fixing of the step motor and a projection integral with the bracket support.

5. A step motor positioning structure according to claim 4, wherein the second positioning member comprises one of a reamer bolt screwed into a corresponding threaded hole formed in the bracket support, a knock pin force-fitted in the bracket support, a jig-pin fittingly engageable in a corresponding hole formed in the bracket support and removable from the bracket support after positioning and fixing of the step motor and a projection integral with the bracket support.

6. A belt-type continuously variable transmission comprising:

a primary pulley;
   a secondary pulley;
   a belt wound around the primary pulley and the secondary pulley;
   a speed-change control valve for controlling a primary pressure to be supplied to the primary pulley;
   a servo link;
   a step motor for driving, by way of the servo link, the speed-change control valve in response to a speed-change command signal;
   the servo link being connected to the primary pulley to follow a variation in a width of a groove of the primary pulley and thereby perform feedback control of the width of the groove of the primary pulley;
   a motor bracket formed integral with the step motor and having an elongated hole and a circular hole;
   a stationary bracket support supporting thereon the motor bracket;
   a first positioning member protruding outward from the bracket support and inserted in the elongated hole;
   a second positioning member protruding outward from the motor support and inserted in the circular hole; and
   a valve body disposed under the primary pulley and constituting part of the speed-change control valve,
   wherein the bracket support is integrally formed with the valve body to protrude upward therefrom.

7. A belt continuously variable transmission according to claim 6, wherein the elongated hole has a pair of parallel side walls that are opposed in a shorter width direction, and the first positioning member is fittingly engaged with the parallel side walls of the elongated hole.

8. A belt continuously variable transmission according to claim 7, wherein the first and second positioning members comprise projections that are formed integral with the bracket support and fittingly engaged in the elongated hole and the circular hole, respectively.

9. A belt continuously variable transmission according to claim 7, wherein the bracket support comprises a pair of positioning holes, and wherein the first and second positioning members comprise knock pins force-fitted in the positioning holes through the elongated hole and the circular hole of the motor bracket.

10. A belt continuously variable transmission according to claim 7, wherein the bracket support comprises a pair of threaded positioning holes, and wherein the first and second positioning members comprise reamer bolts screwed into the threaded positioning holes through the elongated hole and the circular hole of the motor bracket.

11. A belt-type continuously variable transmission according to claim 7, wherein the bracket support comprises a pair of positioning holes, and wherein the first and second positioning members comprise jig-pins fitted in the positioning holes through the elongated hole and the circular hole of the motor bracket.

12. A belt continuously variable transmission according to claim 11, wherein the bracket support further comprises a threaded hole between the positioning holes, the motor bracket is further formed with a bolt hole between the elongated hole and the circular hole, and a bolt is screwed into the threaded hole through the bolt hole.

13. A belt continuously variable transmission according to claim 6, further comprising a pulley follower movable on a guide shaft and engaged with a movable sheave of the primary pulley, wherein the servo link extends transversely of the guide shaft to interconnect the pulley follower, the speed-change control valve and the step motor.

14. A belt continuously variable transmission according to claim 13, wherein the speed-change control valve has a valve spool and the step motor has an axially movable output rod, and wherein the pulley follower, the speed-change control valve and the step motor are arranged in parallel with each other.

15. A belt continuously variable transmission according to claim 14, wherein the servo link has an end pivotally connected to the output rod of the step motor.

16. A belt continuously variable transmission according to claim 15, wherein the servo link has another end pivotally connected to the pulley follower.

17. A belt continuously variable transmission according to claim 16, wherein the servo link has an intermediate portion pivotally connected to the valve spool of the speed-change control valve.

18. A belt continuously variable transmission according to claim 16, wherein each of the ends of the servo link is bifurcated so as to have prongs between which a corresponding connecting pin is movably disposed.

* * * * *